Sept. 22, 1959　　　A. J. RHODES　　　2,904,822
HOOD HINGE ASSEMBLY
Filed May 20, 1957

INVENTORS
ALBERT J. RHODES
BY Whittemore
Hulbert & Belknap
ATTORNEYS

United States Patent Office 2,904,822
Patented Sept. 22, 1959

2,904,822

HOOD HINGE ASSEMBLY

Albert J. Rhodes, Lake Orion, Mich., assignor to American Forging & Socket Company, Pontiac, Mich., a corporation of Michigan Application May 20, 1957, Serial No. 660,291

4 Claims. (Cl. 16—128.1)

The present invention relates to a hood hinge assembly.

It is an object of the present invention to provide a hood hinge assembly of simple and economical construction adapted to mount, support and guide the hood of an automotive vehicle for combined forward swinging and upward movement, together with desirable counterbalancing thereof.

It is a feature of the present invention to provide a hood hinge assembly comprising a stationary bracket, and linkage comprising a pivot lever pivoted intermediate its ends to the bracket, and a bell crank also pivoted to the bracket, a hood supporting link pivoted to the bell crank, and a front link pivoted between the hood supporting link and the pivot lever, together with a control link connecting short control arms on the pivot lever and bell crank to effect predetermined related swinging movement therebetween.

Other objects and features of the invention will become apparent as the description proceeds, especially when taken in conjunction with the accompanying drawing, illustrating a preferred embodiment of the invention, wherein.

Figure 1:
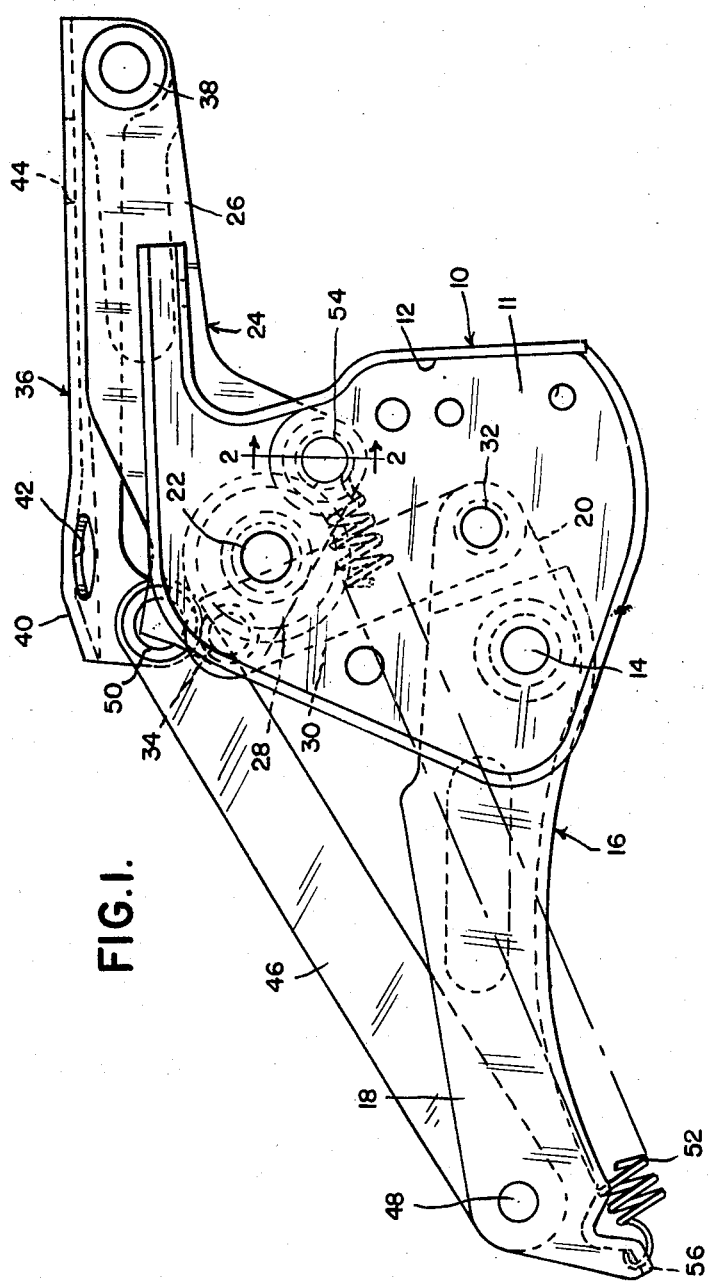
Figure 1 is a side elevational view of a hood hinge assembly.

It is desirable for the hood of an automotive vehicle to be mounted in such a way that when it is in closed condition, the spring means usually provided for counterbalancing action are effective to exert a force tending to hold the hood closed. As the hood is raised, the spring action changes and assists in raising the hood, exerting a force sufficient when the hood is fully raised to maintain it in raised condition.

The present construction accomplishes the foregoing in a simple and efficient manner. It will of course be appreciated that a pair of hinges are provided, one assembly being provided for the right hand side of the hood and one for the left hand side of the hood. Since these assemblies are identical so far as function is concerned, only one will be described in detail.

The hood hinge assembly comprises a mounting bracket 10 including a substantially flat plate portion 11 which is stiffened and reinforced by having its edge portion turned at 90 degrees, as indicated at 12.

The bracket comprises means providing fixed mountings for a pair of levers. Adjacent the lower front corner of the plate 11 there is provided a pivot mounting 14 for a pivot lever indicated generally at 16, the pivot lever including a relatively long forwardly extending pivot arm 18 which occupies a substantially horizontal position when the hood is down or in closed position. Extending rearwardly from the pivot mounting 14, the pivot lever 16 comprises a relatively short pivot control arm 20.

Pivot means 22 located substantially above and slightly rearwardly of the pivot mounting 14, provides a fixed pivot support for a bell crank indicated generally at 24. The bell crank comprises a relatively long crank arm 26 which extends rearwardly and substantially horizontally when the hood is closed. The bell crank also includes a relatively short crank control arm 28.

A control link 30 is provided interconnecting the free ends of the pivot control arm 20 and the crank control arm 28 to which it is pivotally connected by pivot means 32 and 34 respectively.

From the foregoing construction it will of course be apparent that any swinging movement imparted to either the pivot lever 16 or the bell crank 24 results in corresponding controlled swinging movement of the other.

Means are provided for connecting the hood of the vehicle to the hinge assembly. In some cases the hood may include a reinforcing and supporting element which when pivotally connected to the hinge assembly, itself constitutes a link in the system. However, in Figure 1 a separate hood support link 36 is provided which is connected to the rear end of the relatively long crank arm 26 of the bell crank by a pivot connection 38 and which extends forwardly and substantially horizontally therefrom when the hood is closed. The hood supporting link 36 includes a laterally bent flange portion 40 having openings 42 and 44 to provide means for fastening the link to the hood.

A front link 46 is provided which is pivoted to the pivot arm 18 adjacent its forward end by pivot means indicated at 48. The front link extends upwardly and rearwardly when the hood is closed from the pivot means 48 to the front end of the hood support link 36, to which it is pivotally connected by pivot means 50.

Figure 2:
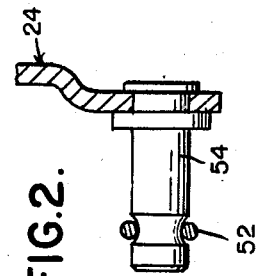
Figure 2 is a fragmentary sectional view on the line 2—2, Figure 1.

To provide counterbalance means, a coil spring 52 is connected between the front end of the pivot arm 18 and a pivot pin 54, details of which are best seen in Figure 2. The pivot pin 54 is located adjacent the lower edge of the bell crank 24. The forward end of the spring 52 is received in a notch 56 at the extreme front end of the pivot lever 18. Accordingly, a spring of maximum length, considering the dimensions of the parts, is provided for.

It will be observed that with the hood closed with the parts in the position illustrated in Figure 1, the spring pull at 56, tending to raise the hood, is overcome by the spring pull at 54, tending to maintain the hood closed, and more particularly to maintain the back of the hood against the body. As the hood is raised, the spring pull at 56 tending to rotate the pivot arm in clockwise direction overcomes the spring pull at 54 which tends to rotate the bell crank 24 in a counterclockwise direction. This action takes place before the centerline of the spring moves over the axis of the pivot point 22, and as it moves above the axis of the pivot 22, the forces tending to lift the hood increase much more rapidly and counterbalance the hood in raised position.

The drawings and the foregoing specification constitute a description of the improved hood hinge assembly in such full, clear, concise and exact terms as to enable any person skilled in the art to practice the invention, the scope of which is indicated by the appended claims.

What I claim as my invention is:

1. A hood hinge comprising a bracket, a pivot lever pivotally connected to said bracket intermediate its ends and having a relatively long forwardly extending pivot arm which is substantially horizontal when the hood is closed and a relatively short pivot control arm extending rearwardly from the pivot connection between said bracket and pivot lever, a bell crank lever pivotally connected to said bracket at a point spaced substantially from and generally above the pivot connection between said bracket and pivot lever and having a relatively long rearwardly extending crank arm which is substantially horizontal when the hood is closed and a relatively short forwardly extending crank control arm, a control link pivotally connected at its ends to the free ends of said pivot control arm and said crank control arm, means defining a hood support link pivotally connected at one end to the rear end of said relatively long crank arm and extending substantially horizontally forwardly therefrom when the hood is closed, a front link pivotally connected at its ends to the front ends of said pivot arm and said hood support link, and a tension spring connected between the front end of said pivot arm and said bell crank and having a line of action when the hood is closed, extending above the pivot connection between said pivot lever and bracket, and below the pivot connection between said bell crank and bracket.

2. A hood hinge as defined in claim 1 in which the tension spring is connected to said bell crank at a point such that upon limited upward movement of the hood, the line of action of said spring crosses the axis of the pivot mounting of the bell crank and thereafter exerts on the bell crank a hood raising torque.

3. The hood hinge as defined in claim 2 in which the front end of said pivot arm forwardly of the pivot connection between said pivot arm and front link is notched to receive one end of said spring, and a laterally projecting pin is provided on said bell crank to engage the opposite end of said spring.

4. A hood hinge comprising a bracket, a pivot lever pivotally connected to said bracket intermediate its ends and having a relatively long pivot arm which extends substantially forwardly when the hood is closed and a relatively short pivot control arm extending rearwardly from the pivot connection between said bracket and pivot lever, a bell crank lever pivotally connected to said bracket at a point substantially above the pivot connection between said bracket and pivot lever and having a relatively long crank arm extending substantially rearwardly when the hood is closed and a relatively short forwardly extending crank control arm, a control link pivotally connected at its ends to the free ends of said pivot control arm and said crank control arm, means defining a hood support link pivotally connected at one end to the rear end of said relatively long crank arm and extending forwardly therefrom when the hood is closed, a front link pivotally connected at its ends to the front ends of said pivot arm and said hood support link, and a tension spring connected between the front end of said pivot arm and said bell crank and having a line of action when the hood is closed, extending above the pivot connection between said pivot lever and bracket, and below the pivot connection between said bell crank and bracket, said pivot arm and the point of connection between said spring and said bell crank being swingable upwardly upon opening movement of the hood, to cause the line of action of said spring to traverse the pivot connection between said bell crank and said mounting bracket.

References Cited in the file of this patent

UNITED STATES PATENTS 2,683,280    Martens ---------------- July 13, 1954